Patented May 8, 1951

2,551,737

UNITED STATES PATENT OFFICE 2,551,737

TREATMENT OF INHIBITORS

Vladimir Haensel, Hinsdale, Ill., assignor to Universal Oil Products Company, Chicago, Ill., a corporation of Delaware No Drawing. Application May 25, 1948,
Serial No. 29,189

4 Claims. (Cl. 252—404)

This application is a continuation-in-part of my co-pending application Serial No. 564,905 filed November 23, 1944 now abandoned.

This invention relates more particularly to the treatment of inhibitors comprising tars or fractions thereof distilled from various types of woods.

Inhibiting materials in use at the present time are of varying physical and chemical properties, some being synthesized chemical compounds and others being of semi-refined or mixed character. Some are solid at ordinary temperatures and others are liquid, and their relative solubilities in hydrocarbons and in water vary considerably, as does their inhibiting potency measured in terms of the retardation in loss of properties which they are able to effect. The deterioration of unstable gasolines, such as cracked gasolines, under average storage conditions, particularly when there is access of both light and oxygen, is evidenced by the appearance of color, the formation of gum and resinous materials some of which may ultimately precipitate on prolonged standing, and a loss in antiknock value. Analytical and test work has practically established that these changes are due to a primary formation of peroxides by the addition of an oxygen molecule to the olefins and/or diolefins, these peroxides instigating an extensive series of chain reactions leading to the formation of polymers of the aforesaid olefins and/or diolefins and finally to the polymerization of some mono-olefins, along with other reactions of a more or less complicated character whose exact nature is not easily determined.

The effect of inhibitors or antioxidants upon the slowing up of these reactions of deterioration is apparently due to their preferential affinity for the oxygen in the initially-formed peroxides so that the reactions of polymerization, etc., are definitely prevented as long as the inhibitor itself is not entirely consumed. By the proper use of selected inhibitors in quantities varying with the chemical nature of the unstable gasolines, particularly in regard to their diolefin content, it is readily possible at the present time to preserve the desirable properties of gasolines over the normal period of storage in refineries, which may run from approximately two to six months.

Wood tar inhibitors have been found to be particularly efficient in arresting the deterioration of cracked gasolines. The use of these relatively efficient and cheap inhibitors are disclosed in Patents 1,889,835 and 1,889,836. While practically all of the oily distillates produced in the distillation of woods have some efficiency in this regard, it has been found that the tars from hard woods are generally better than those from soft woods and further that selected fractions, corresponding generally to what may be termed a heart cut, of the settled tars (usually boiling within the approximate ranges of 218 to 300° C.) have the greatest potency.

The present invention is directed to a novel method of treating the wood tar distillates in order to increase their inhibitor activity.

In a broad aspect the present invention comprises a process for increasing the inhibiting value of wood tar distillates having anti-oxygenic properties, which comprises treating the tar distillate with a dilute aqueous salt solution at a temperature of from about 225° to about 300° C.

In one specific embodiment the present invention relates to a process for increasing the inhibiting value of wood tar distillates having antioxygenic properties, which comprises treating the tar distillate with a dilute solution of ammonium chloride at a temperature of from about 225° to about 300° C.

In another embodiment the present invention relates to a process for increasing the inhibiting value of wood tar distillates having anti-oxygenic properties, which comprises treating the tar distillate with a dilute solution of magnesium chloride at a temperature of from about 225° to about 300° C.

By the use of the above described process, it has been found that the inhibiting potency of wood tar fractions is materially increased, as will be shown in later examples. This has been demonstrated by laboratory tests, specifically by the use of the so-called oxygen bomb test, which is an accelerated test employing oxygen under pressure at 100° C. and which indicates the period of time preceding a measurable rate of oxygen absorption as the "induction period" of a given gasoline. The use of inhibitors extends the induction period, and an induction period of over 240 minutes has been generally adopted as indicating a satisfactory gasoline under average conditions of refinery storage. This has been determined by a large amount of experimental work in which induction periods were correlated with results obtained under actual storage conditions. The amount of a given inhibitor necessary for properly stabilizing any gasoline is, in general, inversely proportional to the induction period which it produces, and consequently when the potency of a wood tar fraction has been increased by the present process, the amount of the inhibitor required is accordingly decreased.

The catalysts suitable for use in the process of the present invention comprise dilute aqueous salt solutions. It is a particular feature of the present invention that the solution is not stronger than a 10% solution. Suitable salts include the halides, particularly the chlorides and bromides of ammonium, magnesium, zinc, iron, aluminum, copper, manganese, nickel, cobalt, etc. While the iodides and fluorides may be used in certain cases, the chlorides are preferred because they usually are readily available and are cheaper. The preferred catalysts comprise dilute aqueous solutions of ammonium chloride and magnesium chloride. It is understood that the different salts herein specified are not necessarily equivalent in their activity.

The operating details of the present process are comparatively simple and the process may be conducted in well-known forms of equipment. In a batch type of operation, the wood tar fraction and the dilute aqueous salt solution are disposed in a suitable zone and the mixture is heated to the desired temperature, after which the mixture is allowed to cool, either in the same or different zones. After suitable settling, an oil phase will separate from an aqueous phase, each of these phases is separately removed, and the oil phase is recovered as such as the final product of the process but preferably is subjected to a final distillation in order to separate a fraction of the desired boiling range as the final desired product.

In continuous operations, the mixture of wood tar fraction and dilute aqueous salt solution is heated by suitable means as, for example, by being directed through a heating zone disposed within the furnace, and the heated products are subsequently cooled and allowed to settle into an oil phase and an aqueous phase. As in the batch type of operation, the oil phase is preferably subjected to a final distillation to separate the desired fraction. The aqueous phase, from either the batch or continuous process, may be treated by any suitable means in order to recover the desired components thereof.

As will be shown in the following example, a temperature of 200° C. is too low for satisfactory operation. In fact, the induction period obtained on the gasoline containing the wood tar fraction treated at 200° C. is lower than the induction period obtained on another sample of the same gasoline containing the same amount of untreated wood tar fraction. Therefore, it is an essential feature of the present invention that the temperature for treating the wood tar fraction must be greater than about 225° C. It generally will be unnecessary to utilize temperatures higher than 300° C. and, therefore, the temperature to which the wood tar fraction should be heated is within the range of from about 225° to about 300° C.

There generally is no advantage to be gained in the use of superatmospheric pressure over and above that normally generated in the process. However, it is desired that the treatment be effected in liquid phase and in some cases it may be preferred to employ sufficient superatmospheric pressure so that the material in the reaction zone is in liquid phase.

Usually the weight ratio of wood tar fraction to dilute aqueous salt solution will be approximately within the range of 0.1:1 to 2:1, although it is understood that smaller or larger proportions may be utilized in some cases.

As heretofore set forth, it is another particular feature of the present invention that the aqueous salt solution is not stronger than a 10% solution. As will be shown in the later example, the preferred solution is of the order of a 3% solution, and the use of a 3% ammonium chloride solution results in an inhibitor product of greater potency than that obtained when using a 10% ammonium chloride solution.

The exact nature of the chemical reactions occurring during the treatment are not known with complete accuracy but it is believed that one of the primary reactions is demethylation of phenol ethers present in the wood tar distillate. The present process may also be applicable to the demethylation of selected charging stocks comprising essentially a phenol ether such as, for example, anisol.

The following examples are introduced to further illustrate the novelty and utility of the present invention but not with the intention of unduly limiting the broad scope thereof.

A wood tar fraction having a 10% boiling point of about 240° C. and an 80% boiling point of about 280° C. was the charging stock for treatment in the following examples. For comparative purposes this wood tar fraction is assigned an inhibitor activity of 1, and the potency of the treated products is reported in comparison to this activity.

In each of the examples below, the reaction products were cooled and separated into an oil phase and an aqueous phase. The oil phase was subjected to distillation under vacuum to separate a fraction boiling between 60° and 149° C., which roughly will correspond to an atmospheric distillation fraction of about the same boiling range as the original wood tar fraction charged to the process. In the following examples the treated inhibitor refers to the fraction boiling between 60° C. and 149° C. from the vacuum distillation.

*Example I*

100 grams of the wood tar fraction charging stock is heated with 100 grams of a 3% ammonium chloride solution at a temperature of 275° C. for a period of 4 hours. 0.05% of the treated inhibitor is added to Pennsylvania cracked gasoline and an induction period test is made. The inhibitor ratio of the treated product compared to the original charging stock is 1.97.

59.9 grams of the treated inhibitor are recovered which, on the basis of both inhibitor effectiveness and amount of inhibitor recovered, corresponds to a yield of 118 inhibitor units as compared to the original charging stock of 100 inhibitor units. However, it is expected that in large scale production a greater amount of the treated inhibitor may be recovered and this would accordingly increase the yield of inhibitor units.

*Example II*

In a test similar to Example I but using a temperature of 250° C., 67.5 grams of treated inhibitor product are obtained having an inhibitor ratio of 1.78 when used in an amount of 0.075% by weight in Pennsylvania cracked gasoline. On the same basis as Example I, the yield of inhibitor units amounts to 120.

*Example III*

In a test similar to Example II but using a temperature of 200° C., the product had an inhibitor ratio of 0.56 when used in an amount of 0.075% by weight in Pennsylvania cracked gasoline.

This example shows that a temperature of 200° C. is too low to be used for treating the wood tar fraction. Therefore, it is an essential feature of the present invention that the temperature of treatment be at least 225° C.

*Example IV*

In a test similar to Example II but using a 10% solution of ammonium chloride, 71.6 grams of a treated inhibitor having an inhibitor ratio of 1.51 are obtained, and this amounts to a yield of inhibitor units of 108.

It is to be noted that the 10% ammonium chloride solution produces an overall yield of inhibitor units of less than that obtainable when using a 3% ammonium chloride solution under the same conditions of treatment.

*Example V*

The aqueous phase separated in an earlier experiment is extracted with ether and the resultant aqueous phase is used as a catalyst in a subsequent run employing substantially the same conditions as in Example I. 74.8 grams of a treated inhibitor having an inhibitor ratio of 1.65 and an overall yield of inhibitor units of 123 are obtained.

It is to be noted, from the above test, that the aqueous phase after use is still active catalytically and may be re-used in the same or different operation for further treatment of the wood tar fraction.

*Example VI*

100 grams of the wood tar fraction charging stock is heated in the presence of 100 grams of a 3% magnesium chloride solution at 275° C. for four hours. 79.3 grams of a treated inhibitor having an inhibitor ratio of 1.65 are obtained, and this corresponds to a yield of inhibitor units of 131.

*Example VII*

The aqueous phase from Example VI is extracted with ether and 92 grams of the resultant aqueous solution are admixed with 100 grams of the original wood tar fraction charging stock and the mixture is heated to a temperature of 275° C. for four hours. 77.1 grams of the treated inhibitor, having an inhibitor ratio of 1.63 are recovered, and corresponds to a yield of inhibitor units of 126.

I claim as my invention:

1. A process for treating a wood tar distillate to improve the inhibiting properties thereof which comprises heating said distillate to a temperature of from about 225° C. to about 300° C. while in contact with an aqueous solution containing from about 3% to about 10% of an inorganic halide salt selected from the group consisting of ammonium chloride and magnesium chloride, the weight ratio of said distillate to said solution being within the approximate range of 0.1:1 to 2:1, separating an oil phase from the reaction mixture, and recovering from said oil phase a wood tar distillate of improved inhibiting value.

2. A process for treating a wood tar distillate to improve the inhibiting properties thereof which comprises heating said distillate to a temperature of from about 225° C. to about 300° C. while in contact with an aqueous solution containing from about 3% to about 10% of an inorganic halide salt selected from the group consisting of ammonium chloride and magnesium chloride, the weight ratio of said distillate to said solution being within the approximate range of 0.1:1 to 2:1, separating the reaction mixture into an oil phase and an aqueous phase, distilling said oil phase, and recovering a wood tar distillate of improved inhibiting value.

3. A process for treating a wood tar distillate to improve the inhibiting properties thereof which comprises heating said distillate to a temperature of from about 225° C. to about 300° C. while in contact with an aqueous solution containing from about 3% to about 10% of ammonium chloride, the weight ratio of said distillate to said solution being within the approximate range of 0.1:1 to 2:1, separating an oil phase from the reaction mixture, and recovering from said oil phase a wood tar distillate of improved inhibiting value.

4. A process for treating a wood tar distillate to improve the inhibiting properties thereof which comprises heating said distillate to a temperature of from about 225° C. to about 300° C. while in contact with an aqueous solution containing from about 3% to about 10% weight ratio of magnesium chloride, the weight ratio of said distillate to said solution being within the approximate range of 0.1:1 to 2:1, separating an oil phase from the reaction mixture, and recovering from said oil phase a wood tar distillate of improved inhibiting value.

VLADIMIR HAENSEL.

REFERENCES CITED

The following references are of record in the file of this patent:

UNITED STATES PATENTS

| Number | Name | Date |
|---|---|---|
| 1,917,648 | Kimball | July 11, 1933 |
| 2,083,197 | Lowry, Jr., et al. | June 8, 1937 |
| 2,123,540 | Morrell | July 12, 1938 |
| 2,123,541 | Morrell | July 12, 1938 |
| 2,387,920 | Lowry, Jr., et al. | Oct. 30, 1945 |